July 24, 1934.  E. JANTZEN ET AL  1,967,938
FOAM SEPARATOR FOR FERMENTATION PLANTS AND THE LIKE
Filed Oct. 20, 1932
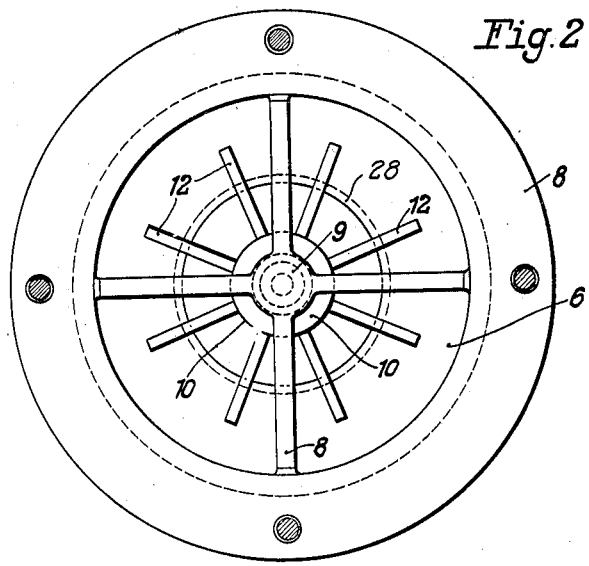
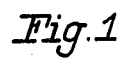
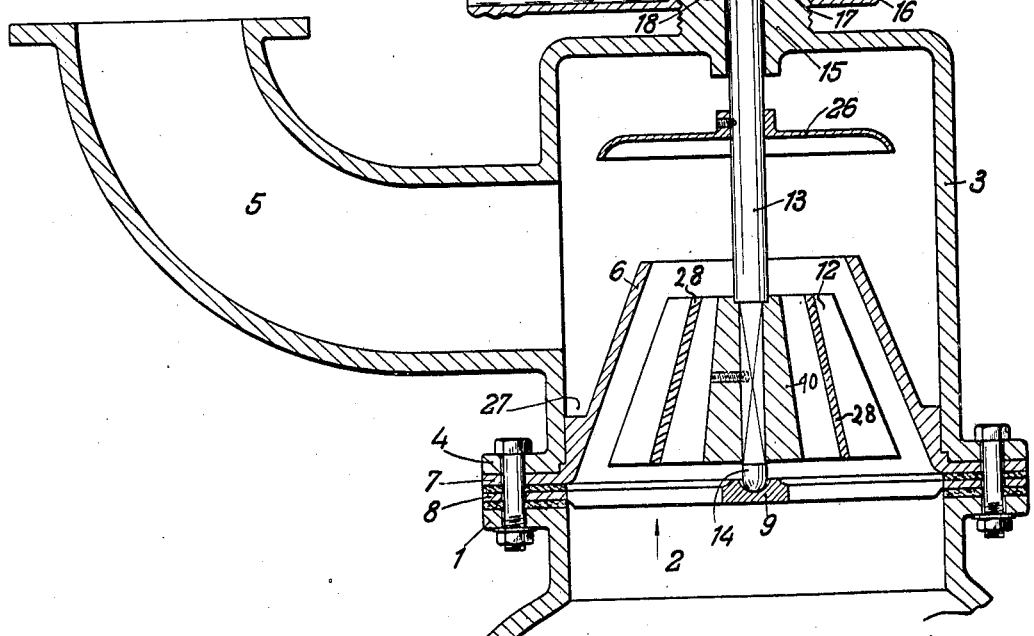
Inventors:
Ernst Jantzen
& Hans Schmalfuss
Attorney:

Patented July 24, 1934

1,967,938

UNITED STATES PATENT OFFICE 1,967,938

FOAM SEPARATOR FOR FERMENTATION PLANTS AND THE LIKE

Ernst Jantzen and Hans Schmalfuss, Hamburg, Germany

Application October 20, 1932, Serial No. 638,818
In Germany October 27, 1931

4 Claims. (Cl. 183—2.6)

The invention relates to a device for the separation of foam or froth by means of a rotating body.

As is known in fermenting processes for example in the alcoholic fermentation and the like by ferments as yeast cells, bacteria, fungi and the like, gases such as carbon dioxide and readily volatile substances such as alcohols and the like are generally produced which escape from the fermenting solution and create a very strong foam formation. The fermentation vats must accordingly be of very large capacity (which however is not fully utilized) in order that the foam which is formed does not flow over the edge of the container and in order moreover to avoid losses of fermentation liquid or the contamination of the volatile products. This drawback of a strong formation of foam is more particularly noticeable in the recovery of volatile organic substances such as alcohols, aldehydes, ketones, diacetyl and the like. It has already been proposed to use clarifying devices by which the foam particularly in fermentation plants is divided by centrifugal action into liquid and volatile constituents. These devices were arranged on the surface of the foam producing liquid so that the foam was sucked into the device and conducted through a rotating blade wheel and the segregated gases and the liquid were led away along the same course. Use has been made also above the surface of the liquid of rotating blade wheels which were intended to disintegrate the foam. The foam has also been conveyed through centrifugal machines and the gaseous and liquid constituents were separated in this manner.

None of these devices however was capable of commercial introduction because they proved incapable of producing an effective removal of the foam. More particularly such devices cannot be utilized at the outlet of a closed receptacle if it is required to bring the liquid constituents of the foam back into the vessel and the gaseous constituents are to be led away, for example in the case of the recovery of solvents or the like.

Now according to this invention provision is made of a device for the separation of foam by means of a rotating body which is characterized by the rotating body being surrounded by a jacket, mantle, or concentrical wall at a small distance therefrom. The rotating body according to the invention may be subdivided by concentrical walls. Arranged preferably above the cape-like device is a trapping disc for trapping and leading away the bearing oils and the like.

A constructional form of the invention is illustrated by way of example in the accompanying drawing in which:

Fig. 1 represents a foam separator according to the invention in vertical section, and Fig. 2 is a view from below looking towards the rotating body.

As shown in Fig. 1 mounted on the flange 1 of the exit opening 2 of a fermentation vessel or vat by means of a flange 4 is a cylindrical housing 3. This cylindrical housing 3 is connected on one side to a pipe socket 5 or the like leading to outward, for example, to a liquefier. Built into the housing 3 at its bottom end is a cone-shaped cape or jacket 6 secured by a flange 7. Secured below the flange 7 may be a transverse member 8 provided with a bearing 9 for the journalling of the foam separator.

The foam separator consists of a cone-shaped member 10 provided with wings or beaters 12. The body 10 is secured to a shaft 13, the lower end 14 of which runs in the bearing 9 and the upper end of which is rotatably journalled in a bearing 15. Secured to the upper part of the shaft 13 is an adjusting ring 16 accommodated in a recess in the bearing 15 and rotatable if need be on a ball bearing 18. The bearing 15 is packed in the upward direction by a stuffing box 19 which by preference is provided with a water jacket 20 having inlet and outlet pipes 21, 22 for cooling water. By the inner portion 23 of the stuffing box pressure is exerted in tightening on the packing 24 in known manner whereby a gas-tight closure is attained against the interior of the housing 3. Arranged at the upper end of the shaft 13 is a belt or rope pulley 25 or some other suitable driving device. The central portion of the shaft 13 may in addition carry a trap disc 26 of some suitable kind extending beyond the upper edge of the coneshaped jacket 6 and serving for trapping oil or the like dripping from the bearing 15, which oil by the rapidly rotating disc 26 is thrown against the lateral wall of the housing 3 and collects in a groove 27 formed between the housing wall 3 and the conical jacket 6. By some suitable tapping device not shown in the drawing any oil collected in the groove 27 may if need be drain off. The rotary body 10 may also be subdivided by means of a concentric mantle face or by several such partitions as indicated for example in Fig. 1 at 28. In this case the stationary jacket member 6 might be omitted. The foam which first of all enters the interior of the body 10 is thrown by centrifugal force against the concentrically conical mantle face 28 and here already separated into its gaseous and liquid constituents. The liquid constituents and the remnant of the foam not thrown off are driven centrifugally towards the large end of the conical mantle face 28, that is to say, downwardly in the drawing and by the lower edge of the conical face 28 are thrown centrifugally against the outer jacket 6 and here completely separated. The operation of the foam separator according to the invention is as follows:

Assuming a fermentation liquid to be present in the container 2 from which carbon dioxide and alcohol are to be recovered. By the fermenting process a strong development of foam takes place. The foam permeated with fermenting liquid rises through the opening 2 of the container upwardly and passes into the rapidly rotating separator 10. The number of revolutions of the foam separator may vary, being dependent on the conditions in any particular case. The foam bubbles rise and are torn and beaten up by the blades 12. The liquid is thrown against the conical jacket 6, dripping back into the container 2. The gaseous constituents however rise in the spaces between the blades and escape by way of the housing 3 and the pipe socket 5.

The foam separator according to the invention may be made of any suitable material, for example, copper, iron, lead or acid resisting substances such as acid-proof alloys, metallised or metal coated materials or indifferent substances such as metals coated or covered with artificial horn and the like or glass, porcelain, clay, wood or the like.

The invention is not restricted to the constructional form illustrated by way of example in the drawing. It was found that the mixture of foam and gas may be conveyed for instance from above on to a rotary body, a spoked disc, a closed disc or the like, in which case the liquid thrown against the housing drips downwardly and the gaseous constituents may by suitable arrangements be divided laterally or delivered in upward direction.

The device is suitable not only for preventing excessive foaming of fermenting liquids, but may be employed also in the case of foam generating charges or boiling liquids, particularly in vaporizers under low pressure or the like. It was found also that foam separators according to this invention are far more suitable for evaporation than the known trapping devices which are based on the creation of large surfaces, retardation of the steam current by the use of large cross sections in the vessel or by the action of impact on baffles or the like.

The device according to this invention is suitable further for separating dusts containing fine particles of liquid or solid substances as obtained in the mineral oil or tar distillation, in the production of sulfuric acid, in the production of metals from ores etc.

Experiments have shown that with the aid of foam separators according to the invention the strongest possible foam or dust formation can be readily overcome.

We claim:

1. A device for the separation of foam into liquid and volatile constituents, comprising a rapidly rotating substantially conical beater member and a substantially conical wall surrounding and closely adjacent said beater member, said member and wall tapering inwardly in the direction of the flow of material therethrough.

2. A device for the separation of foam into liquid and volatile constituents, comprising a rapidly rotating substantially conical beater member and a substantially conical wall surrounding and closely adjacent said beater member, said member and wall tapering inwardly in the direction of the flow of material therethrough, said beater member having passages therethrough open at the smaller outlet end of the beater.

3. A device for the separation of foam into liquid and volatile constituents, comprising a rapidly rotating beater body, blades on said body extending longitudinally thereof and having outer edges tapering inwardly in an upward direction and a substantially frustro-conical wall tapering inwardly in the same direction as said blades surrounding and closely adjacent to the edges of said blades, said wall having an opening in the smaller upper base of the frustrum through which volatile constituents may escape from the beater, a driving shaft of less diameter than said opening extending therethrough, said beater body being mounted on said shaft, and an oil shield on said shaft above and spaced from said opening, said shield being of greater diameter than the smaller base of said frustro-conical wall whereby oil dripping from said shield will fall on the upper outer inclined surfaces of said wall.

4. A device for the separation of foam into liquid and volatile constituents comprising means to direct the flow of the foam in one direction, means to throw the foam moving in such direction outwardly by centrifugal action, and an inwardly tapering conical wall against which the foam is thrown for breaking up the foam and positively directing the liquid constituents in the opposite direction while permitting escape of the volatile constituents in the direction of movement of the foam.

ERNST JANTZEN.
HANS SCHMALFUSS.